United States Patent
Gibson

(10) Patent No.: US 11,049,140 B2
(45) Date of Patent: Jun. 29, 2021

(54) PRODUCT PACKAGE AND ASSOCIATED SYSTEM FOR IMPROVING USER-PRODUCT ENGAGEMENT

(71) Applicant: Xerox Corporation, Norwalk, CT (US)

(72) Inventor: George A. Gibson, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 785 days.

(21) Appl. No.: 14/879,452

(22) Filed: Oct. 9, 2015

(65) Prior Publication Data

US 2017/0103419 A1    Apr. 13, 2017

(51) Int. Cl.
G06Q 30/02    (2012.01)

(52) U.S. Cl.
CPC ..... *G06Q 30/0257* (2013.01); *G06Q 30/0267* (2013.01); *G06Q 30/0269* (2013.01)

(58) Field of Classification Search
USPC ...................................................... 705/14.64
See application file for complete search history.

(56) References Cited

U.S. PATENT DOCUMENTS

| | | | |
|---|---|---|---|
| 7,336,186 B2 | 2/2008 | Noguchi | |
| 7,775,430 B2 | 8/2010 | Lin | |
| 8,261,972 B2 | 9/2012 | Ziegler | |
| 8,294,554 B2 * | 10/2012 | Shoarinejad | G01S 19/13 340/10.1 |
| 2002/0137502 A1 | 9/2002 | Cronin et al. | |
| 2006/0219858 A1 * | 10/2006 | Iacovino | A47G 23/02 248/311.2 |
| 2008/0289235 A1 | 11/2008 | Free | |
| 2009/0014536 A1 | 1/2009 | Gelbman | |
| 2009/0084850 A1 * | 4/2009 | Silverbrook | G06F 3/014 235/462.15 |
| 2009/0145966 A1 | 6/2009 | Silverbrook et al. | |
| 2009/0274278 A1 | 11/2009 | Haldeman | |
| 2011/0055030 A1 * | 3/2011 | Nicolas | G06Q 30/0211 705/16 |

(Continued)

OTHER PUBLICATIONS

A Ubiquitous NFC Solution for the Development of Tailored Marketing Strategies Based on Discount Vouchers and Loyalty Cards (Year: 2013).*

(Continued)

*Primary Examiner* — Gautam Ubale
(74) *Attorney, Agent, or Firm* — Fox Rothschild LLP

(57) ABSTRACT

A system for promoting user-product engagement including a plurality of token readers and a messaging system server is disclosed. Each of the plurality of token readers comprises one or more sensors configured to detect a code from a token associated with a packaged product when the token is in a range of the sensor, and also detect a user identifier from a proximate mobile electronic device, and a transmitter. The messaging system server is configured to receive a signal emitted by any of the plurality of transmitters associated with each of the plurality of token readers, retrieve, from a data store, profile information for a user who is associated with the user identifier, update the profile information with product information corresponding to the detected code and location information corresponding to the token reader ID, and save the updated profile information to the data store.

23 Claims, 3 Drawing Sheets

(56) References Cited

U.S. PATENT DOCUMENTS

| | | | |
|---|---|---|---|
| 2012/0123673 A1* | 5/2012 | Perks | G06Q 30/0625 |
| | | | 701/426 |
| 2012/0244885 A1 | 9/2012 | Hefetz | |
| 2013/0059534 A1 | 3/2013 | Sobalvarro et al. | |
| 2013/0096715 A1 | 4/2013 | Chung et al. | |
| 2013/0097002 A1 | 4/2013 | Dishneau et al. | |
| 2013/0304553 A1* | 11/2013 | Hertel | G06Q 30/02 |
| | | | 705/14.23 |
| 2015/0038080 A1 | 2/2015 | Stroud | |
| 2015/0088620 A1* | 3/2015 | Wittek | G06Q 30/0207 |
| | | | 705/14.1 |
| 2015/0095168 A1* | 4/2015 | Zises | G06Q 50/12 |
| | | | 705/15 |
| 2015/0317698 A1 | 11/2015 | Kalyvas et al. | |
| 2016/0055360 A1* | 2/2016 | Haugarth | G06Q 30/0201 |
| | | | 340/10.1 |
| 2016/0071115 A1 | 3/2016 | Oh et al. | |
| 2016/0099753 A1 | 4/2016 | Murray | |
| 2016/0227359 A1* | 8/2016 | Hurewitz | G06Q 30/0261 |

OTHER PUBLICATIONS

A Business Model for Personalized Promotion Systems on Using Wlan Localization and NFC Techniques (Year: 2013).*

Lee, C. et al., "Integration of RFID with Mobile Commerce for Consumer Marketing," Department of System Engineering and Management, Nanyang Technological University, Singapore, 2008, pp. 1524-1528.

Sharma, M. et al., "RFID Based Mobiles: Next Generation Applications," IEEE Xplore, 2010.

* cited by examiner

PRODUCT PACKAGE AND ASSOCIATED SYSTEM FOR IMPROVING USER-PRODUCT ENGAGEMENT

BACKGROUND

In the advertising industry there is an ever-present desire to reach potential consumers in new and more effective ways. With the emergence of the internet of things it is desirable to create product experiences that engage the consumer both before and after purchase, and that are cost effective to deploy at the individual product level. It may also be desirable to provide the consumer with information that personalizes the user's experience with a product such as, for example, personalized advertising content, product information for the purchased information, and other such content.

The current disclosure discloses a product packaging label and/or product container and other system concepts that addresses the above limitations, and methods for manufacturing the same.

SUMMARY

In an embodiment, system (and method) for promoting user-product engagement is disclosed. The system may include a plurality of token readers, and a messaging system server. Each of the plurality of token readers comprises one or more sensors configured to detect a code from a token associated with a packaged product when the token is in a range of the sensor, and also detect a user identifier from a proximate mobile electronic device, and a transmitter. The messaging system server may include a processor, a computer-readable memory, and programming instructions configured to cause the processor to: receive a signal emitted by any of the plurality of transmitters associated with each of the plurality of token readers, wherein the signal includes a detected code, a user identifier and a token reader ID, retrieve, from a data store, profile information for a user who is associated with the user identifier, update the profile information with product information corresponding to the detected code and location information corresponding to the token reader ID, and save the updated profile information to the data store. The mobile electronic device may include the messaging system server.

In an embodiment, each of the plurality of token readers may include a coaster; the packaged product may include a beverage container on which the token is applied; and the range of each sensor may include an area proximate to the one or more sensors corresponding to the token reader so that the sensor reads the token when the beverage container is placed proximate to the token reader. Alternatively and/or additionally, each of the plurality of token readers may include an imaging device; the packaged product may include a beverage container on which a token comprising a barcode has been applied; and the range of each sensor may include an area proximate to the one or more sensors corresponding to the token reader so that the imaging device captures an image of the barcode and decodes the barcode when the beverage container is placed proximate to the token reader. In yet another embodiment, each of the plurality of token readers may include a near-field communication receiver or radio-frequency identification device; the packaged product may include a beverage container on which a token comprising a tag that is detectable by the token reader is attached; and the range of each sensor may include an area proximate to the one or more sensors corresponding to the token reader so that the token reader detects the tag when the tag is placed proximate to the token reader.

In some embodiments, the instructions may further include instructions to identify a marketing entity that is associated with the packaged product; generate a message for the marketing entity so that the message includes the product information and user identifier; and send the message to the marketing entity.

In at least one embodiment, the instructions may also include instructions to: identify a marketing entity that is associated with the packaged product; identify a location associated with the token reader ID; generate a message for the marketing entity so that the message includes the product information and the location; and send the message to the marketing entity.

In some embodiments, the instructions may also include instructions to process the profile information for the user and retrieve one or more past locations at which the user previously purchased units of the packaged product; identify one or more prospective locations that are not yet included in the profile information for the user; and cause a user interface of the mobile electronic device to present a message to the user. The message may include the one or more past locations indicating where the user has previously purchased units of the packaged product, and the one or more prospective locations recommendations indicating prospective locations where the user can purchase units of the packaged product.

In an embodiment, the system may also include instructions to identify a social media account that is associated with the user identifier; and generate a message that will cause a social media service to post a communication to the social media account, wherein the communication includes an identifier of the packaged product.

In another embodiment, the system may include additional instructions that are configured to cause the processor to: retrieve a marketing communication that corresponds to the detected code and the user identifier; and transmit the marketing communication to the mobile electronic device so that a display of the mobile electronic device can output the marketing communication to the user.

In another aspect, a method for promoting user-product engagement using a mobile electronic device associated with a user is disclosed. The method may include receiving, from a token reader, by a processor of the mobile electronic device, a token reader ID and a code from a token associated with a packaged product; retrieving, by the processor of the mobile electronic device, profile information for a user; retrieving, by the processor of the mobile electronic device, location information corresponding to the token reader ID; updating, by the processor of the mobile electronic device, the profile information with product information corresponding to the detected code and the location information; and saving the updated profile information to a data store.

In an embodiment, the method may also include, by the processor of the mobile electronic device: identifying a marketing entity that is associated with the packaged product; generating a message for the marketing entity so that the message includes the product information and the profile information; and sending the message to the marketing entity.

In yet another embodiment, the method may include, by the processor of the mobile electronic device identifying a marketing entity that is associated with the packaged product; generating a message for the marketing entity so that the message may include the product information and the location information; and sending the message to the marketing entity.

In at least one embodiment, the method may include, by the processor of the mobile electronic device processing the profile information for the user and retrieve one or more past locations at which the user previously purchased units of the packaged product; identifying one or more prospective locations that are not yet included in the profile information for the user; and causing a user interface of the mobile electronic device to present a message to the user. The message may include the one or more past locations indicating where the user has previously purchased units of the packaged product, and the one or more prospective locations recommendations indicating prospective locations where the user can purchase units of the packaged product.

In yet another embodiment, the method may include, by the processor of the mobile electronic device identifying a social media account that is associated with the user; and generating a message that will cause a social media service to post a communication to the social media account. The communication may include an identifier of the packaged product.

In an embodiment, the method may include, by the processor of the mobile electronic device retrieving, a marketing communication that corresponds to the detected code and the user; and displaying, at a display of the mobile electronic device, the marketing communication to the user.

DETAILED DESCRIPTION

Figure 1:
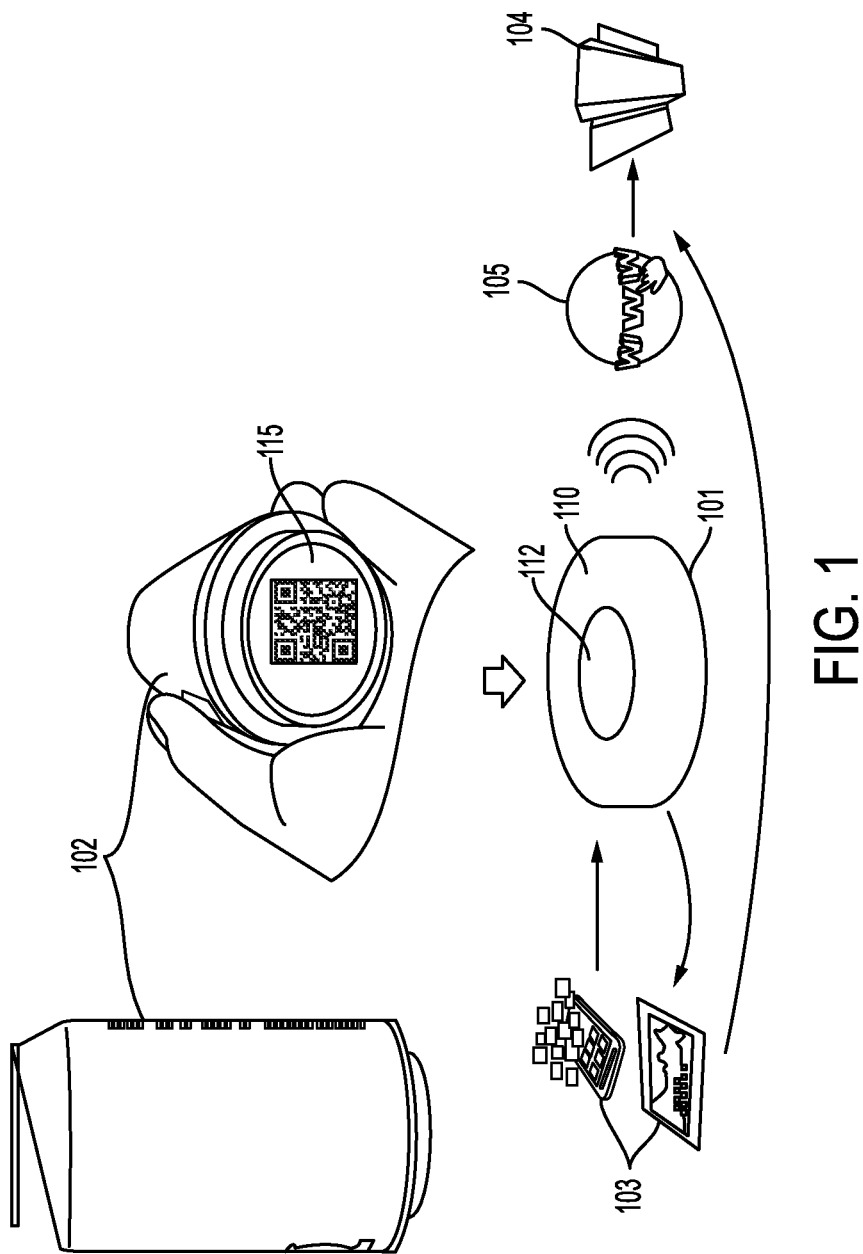
FIG. 1 illustrates an example system for transmitting and receiving product information, according to an embodiment.

This disclosure is not limited to the particular systems, methodologies or protocols described, as these may vary. The terminology used in this description is for the purpose of describing the particular versions or embodiments only, and is not intended to limit the scope.

As used in this document, the singular forms "a," "an," and "the" include plural reference unless the context clearly dictates otherwise. Unless defined otherwise, all technical and scientific terms used herein have the same meanings as commonly understood by one of ordinary skill in the art. All publications mentioned in this document are incorporated by reference. All sizes recited in this document are by way of example only, and the invention is not limited to structures having the specific sizes or dimension recited below. As used herein, the term "comprising" means "including, but not limited to."

The following terms shall have, for purposes of this application, the respective meanings set forth below:

A "product container" refers to a physical item for holding a product having an exterior portion on which a product packaging label may be applied. Example product containers may include, without limitation, food or beverage containers, bottles, cups, books, boxes, shrink wraps, medicine containers, and/or the like.

A "product packaging label" refers to a flexible, thin label that is affixed or attached to, or is integral with, a product container and that includes, without limitation, product information.

A "mobile device" or "mobile electronic device" refers to a portable computing device that includes short range or near-field wireless communication interface such as an NFC, Bluetooth, or Bluetooth low energy interface, a processor and non-transitory, computer-readable memory. As used in this description, a "mobile device" or a "mobile electronic device" may be a single device, or any number of devices having one or more processors that communicate with each other and share data and/or instructions. Examples of mobile electronic devices include, without limitation, personal computers, servers, mainframes, gaming systems, televisions, and portable electronic devices such as smartphones, personal digital assistants, cameras, fitness tracking devices, tablet computers, laptop computers, media players and the like.

Near field communications (NFC) are defined by a collection of standards for radio frequency communications that may be used when two devices are in close proximity. Protocols for implementation of near field communication may comply with industry standards, such as ISO/IEC 18092 or ISO/IEC 18000-3, published by the International Standards Organization. These standards evolve periodically without effect on the principles of the disclosure. Typical ranges for near field communications are approximately 10 cm or less, although it may be 20 cm or less, 4 cm or less, or other ranges. Near field communications can support two-way (or peer-to-peer) communications between devices. In a passive mode, an NFC initiator device may output a carrier field that a target device (or transponder) uses to respond by modulating the provided field. In an active mode, the initiator and the target can each generate a carrier field, and the devices communicate by altering the fields. When utilizing two-way communications, two devices may exchange data to perform various functionalities that are enabled as a result of the near field communications.

Use of the terms "coupled" and "connected", along with their derivatives, may be used. "Coupled" may be used to indicate that two or more elements are in either direct or indirect (possibly with other intervening elements and/or systems between them) physical, communicative, or electrical contact with each other, and/or that the two or more elements co-operate or interact with each other. The term coupling can include establishing a paired communication link whereby the devices recognize each other and transmit information via NFC or a short range communication protocol.

As used herein, the term "communication tag" refers to a device capable of transmitting data, for example utilizing an NFC tag. Communication tags generally comprise a circuit or microchip and an antenna, and may refer to any of passive, active, or semi-active communication tags. The communication tag may be a static tag or a dynamic tag. While the current disclosure describes the embodiments using NFC technology, other communication protocols such as Bluetooth, iBeam, etc. are within the scope of this disclosure.

FIG. 1 shows an example system for transmitting and receiving product information, according to an embodiment. In an embodiment, the system may include a set of token readers 101 configured to read information from a product packaging container 102. The token reader 101 may also include transmitter/receiver components that are configured to receive and/or transmit information from and/or to a mobile electronic device 103. The token reader 101 (and/or the mobile electronic device) may transmit and/or receive information over a network 105 such as the internet to a marketing entity system 104. The mobile electronic device 103 may also transmit information to the product packaging container 102.

In an embodiment, one or more token readers may be provided near a point of purchase of the product associated with the product packaging container. In another embodiment, various token readers may be placed in different physical locations, such as different stores on different locations, or different departments of focus areas within a single store, to track user-product engagement from location to location.

As shown in FIG. 1, the token reader 101 may include a communications tag 110, such as an NFC tag, or Bluetooth, or Bluetooth low energy tag, to enable near field communication with a variety of NFC enabled devices including NFC enabled mobile devices and other NFC tags. The NFC tag 110 may include information to be transmitted to other NFC enabled devices. Near field communications require close proximity (e.g., no more than a few inches, or in some cases no more than one or two feet) to establish a communications link, and hence the operation of establishing a link with another NFC device may be referred to as a "tap." The term "tap" as used herein does not necessarily refer to physical contact between communicating NFC devices, but rather positioning the NFC devices in sufficiently close proximity to establish an NFC communications link. Therefore, a user of an NFC enabled smart phone may tap an NFC tag to send and/or receive data from the tag. Near field communications offers several advantages over other wireless protocols and methods for encoding data to be read by a mobile terminal because of the short range nature of near field communications. Some examples include avoiding cross-talk from other nearby tags, managing access, improving security, and low power requirements. NFC tags may also be configured such that when read by the mobile terminal, cause the mobile terminal to perform certain processing actions, such as launching of applications, navigating to a particular website, or downloading of a particular file.

In an embodiment, the token reader 101 may also include a sensor 112 configured to read information from a product container placed within a sensing range to the token reader. For example, the sensor may be positioned on top of the token reader. The type of sensor may be selected to correspond to the type of encoding used to embed the information on the product container. For example, an imaging device such as an optical sensor may be used if the product container includes information in the form of 2 dimensional bar codes, QR codes, or the like. A laser sensor may be used if the product container includes information in the form of 3 dimensional bar codes. An NFC reader or a radio-frequency identification device may be used if the product container includes information in the form of an NFC tag. The above examples are provided by way of example only and other types of sensors are within the scope of this disclosure.

In an embodiment, the token reader 101 may also include a battery or other power source (not shown here) to provide power to the sensor 112 and/or the NFC tag 110. In an embodiment, the token reader 101 may further include a display, a processor, and/or a memory unit (not shown here). In certain embodiments, the token reader may also include wireless communication components (such as a wireless transmitter, receiver, antenna, etc.) to enable the token reader to communicate with other devices and/or networks over wireless communication networks such as the internet.

The token reader may take any shape, size and/or form without deviating from the principles of the disclosure. For example, the token reader may be a coaster, a product marketing design, a token or other such objects.

As shown in FIG. 1, the product container 102 may include a token comprising encoded information 115. The encoded information may include, without limitation, characters, glyphs, bar codes (1D, 2D or 3D), a universal product code, images, character strings, NFC tags, or other symbols. In an embodiment, the information may be directly printed on the product container. In another embodiment, the information may be printed on a product packaging label affixed to, and/or integral with, the product container. The encoded information may include, without limitation, a unique product identification, manufacturer information, date of manufacture, quantity of product, URLs, ingredient information, price information, geospatial information, and the like.

In an embodiment, the product container 102 may be placed such that the token is in a sensing range of the token reader 101 (such as on top), and the sensor 112 of the token reader may extract the encoded information 115 using any method now or hereafter known to those skilled in the art, from the product container. The token reader 101 may then transmit the extracted information using the NFC tag or any other communication protocol.

In an embodiment, the token reader 101 may also receive user information from the mobile electronic device 103 using the NFC tag or any other communication protocol.

Figure 2:
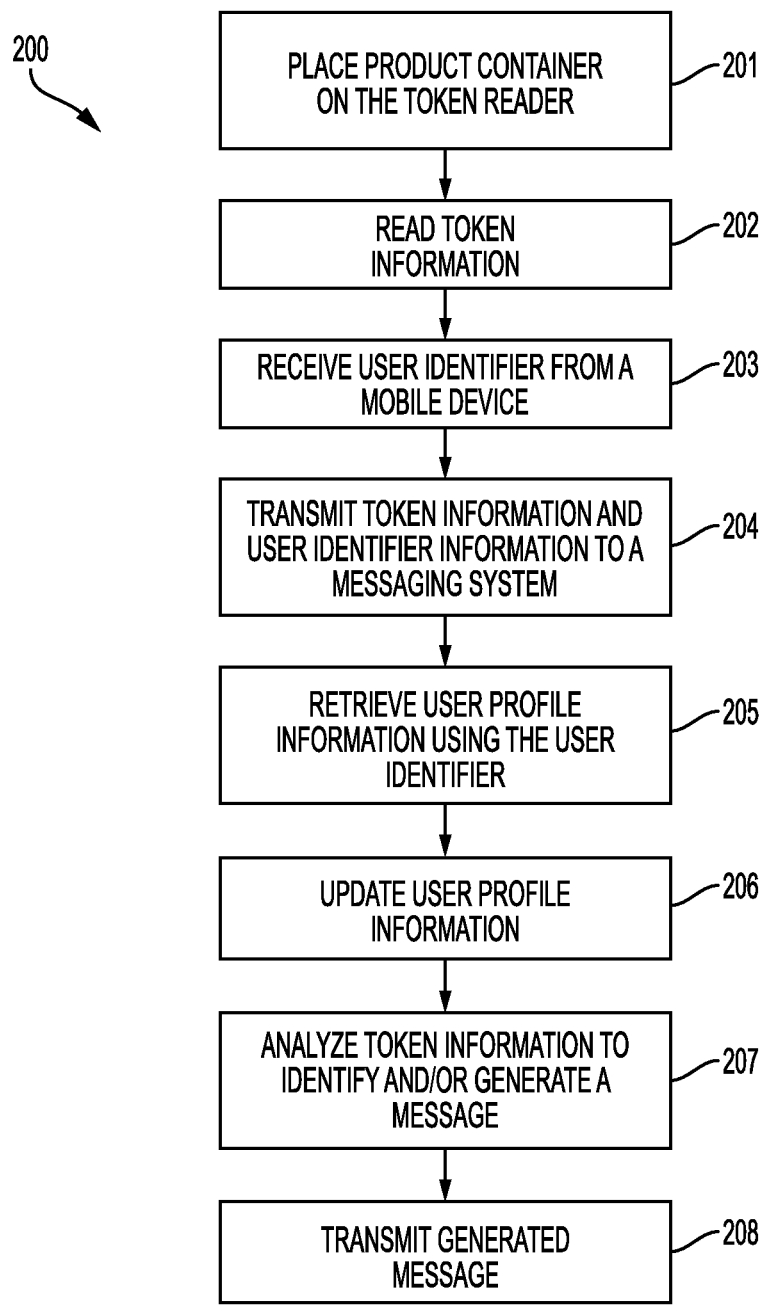
FIG. 2 illustrates a flow chart of an example of transmitting a message from a token reader, via a mobile device, according to an embodiment.

Referring now to FIG. 2, an example method for transmitting information to and/or from a beverage container is described. In step 201, a user may place the product container in a position that is proximate to, i.e. within a sensing range of the sensor of the token reader such that the token reader sensor may extract and/or otherwise read 202 information from the token that is on the product container. In an embodiment, the token reader may store the information.

The token reader may also receive 203 a user identifier (and/or other user related information) from a mobile electronic device associated with the user. Examples of a user identifier may include, without limitation, a user name, mobile electronic device ID, a unique user ID, and other such identifiers. In some embodiments, the user may select one or more types of user identifier information to be transmitted to the token reader. In an embodiment, the user may couple the mobile device to the token reader. As discussed previously, a user may use any now or hereafter known short range communication protocol, such as NFC, to couple the mobile device to the token reader. For example, a mobile phone user may "tap" or otherwise position an NFC-enabled phone proximate to the communication tag (NFC tag) of the token reader to commence transmission of extracted and/or stored secondary information, and transmit the user identifier information.

Optionally, prior to the start of establishing the NFC connection, the mobile device may be in a "wake on NFC" mode. In this mode, the NFC interface of the mobile device may remain inactive until the NFC interface receives an NFC signal from another NFC interface. At the same time, NFC interface of the token reader may be in a host mode. In the host mode, the NFC interface of the token reader may periodically emit NFC signals to seek out other nearby NFC interfaces. Optionally, the token reader may seek to couple a mobile electronic device only after detecting a proximate product container, or the coupling of a mobile device may then trigger the token reader to seek a proximate product container. In certain other embodiments, the token reader may continuously transmit information that a mobile device may detect and receive when it is within the communications range.

The above process, in some embodiments, may require exchange of authentication or encryption data (e.g., username, password, etc.) to ensure security of the transmission. In an embodiment, authentication information may be included in the token information, and/or a user may be prompted to verify the transmission. In addition, the requirement of very close proximity of NFC transmissions serves to further ensure security of the exchange of data. Because NFC transceivers must be within a short distance—often less than a few inches—of each other to function, it is extremely unlikely that another NFC-enabled devices would be capable of intercepting the communication of data between the two NFC transceivers.

In certain embodiments, the mobile device may include a software application to transmit the user identifier (and/or other user information) to the token reader. The software application may register itself with the mobile operating system allowing the application to monitor certain activities on the mobile operating system, and using the functionalities of the operating system. The software application may be launched automatically upon detecting the signal, or may be launched by a user of the mobile device. In other embodiments, the device may automatically prompt the user to confirm whether to launch the software application. In certain embodiments, the mobile application is launched in the background and does not interfere with the already running foreground applications on the mobile device.

The user may acquire the application by downloading it from an application store or from a marketing entity such as a product supplier, manufacturer, vendor, or the like. In certain embodiments, the software application may be pre-installed on the mobile device. The software application may include virtually any application type which may run on any underlying operating system or platform. The software application may correspond to a local application which executes on the mobile device. Alternatively, the software application may represent a web application which executes on a remote application server. That is, the software application may include any application functionality which is accessed by the user over a network and experienced locally as application e.g., using a browser running on the mobile device. Techniques for executing such a web application, and related technology, are well known in the art and are therefore not described further in detail herein, except as may be helpful or necessary to understand operations of system.

In an embodiment, the software application may prompt the user to provide user login credentials before transmitting the user identifier information to the token reader. In certain embodiments, the user login credentials may be used as the user identifier information.

In step 204, the token reader may transmit the received token information and/or the received user identifier, along with a token reader ID to a messaging system. The token reader may transmit the token information and/or the user identifier (and the token reader ID) via any suitable communications protocol such as short-range communication, NFC communication, Wi-Fi, etc.

In some embodiments, the token reader may transmit only the information extracted from the product container token (such as the barcode). In certain other embodiments, the token reader may also transmit stored secondary information in addition to the information extracted from the product container token and/or the user identifier information. The token reader may first process the information extracted from the product container token to link to the appropriate stored secondary information to be transmitted. For example, the token reader may process a barcode extracted from the product container to identify a product identification and/or manufacturer information, and use the identified information to select the appropriate secondary information using known matching and sorting techniques. Examples of stored secondary information may include, without limitation, information such as a URL, a unique identifier for the product container, a date and time stamp of purchase (or placement of product container in the token reader), geographic location of purchase and/or token reader, a date of manufacture of the product, information about the product contents, manufacturer information, vendor information, and the like. A user and/or a marketing entity may update the stored secondary information of the token reader as well as the sorting rules.

In an embodiment, the token reader may include the messaging system. In yet another embodiment, the mobile electronic device of the user may include the messaging system. In certain other embodiments, the messaging system may be separate and distinct from the token reader and/or the mobile electronic device, which may execute on a remote application server.

The messaging system may extract the token information (including the secondary information received) and/or the user identifier information, along with the token reader ID, from the received signal using known techniques in the art. For example, the messaging system may use barcode reader modules, OCR reader modules, or other such modules on the mobile device and/or a network to extract the token information.

In an embodiment, the messaging system may retrieve or extract some or all of the secondary information from a source other than the token reader, such as external database(s) or servers(s). Secondary information retrieved from external databases may include, without limitation, location information for the token reader (based on the token reader ID), information such as product expiry date, product commercials, product ingredient list, product usage directions, customer support information, manufacturer identification, manufacturer information such as an associated URL, promotional information such as coupons, manufacturer format and preferred method for obtaining user information, and other such information. Examples of product identification information may include, without limitation, product name, a unique ID, product type, brand name, etc.

In an embodiment, the messaging system may use the user identifier information to extract or retrieve 205 user profile information for the user from a data store. User profile information may include, without limitation, purchase history information for the user relating to the product associated with the product container and/or other related products (e.g., date of purchase, place of purchase, quantity purchased, user feedback or reviews, etc.), user demographic information, user preference information (provided by the user or based on past user interactions/actions), the geographic location of the user, date and/or time stamp, user-profile, member information to a product loyalty group, and other such information relating to situations and/or events corresponding to the user.

In an embodiment, the data store may interface with various other databases to retrieve user profile information. Examples of such databases may include, without limitation, social media applications such as Facebook, Twitter, and WhatsApp; cloud sourcing applications such as Yelp and Pinterest; public government databases; and other similar means.

In an embodiment, the messaging system may retrieve some or all of the user profile information from a mobile electronic device of the user. For example, the software application of step 203 (and/or a different mobile application) may act as the data store. In an embodiment, a user may register the software application by providing information such as demographic information, location information and/or loyalty card or credit card information, which may enhance the functionality of the software application. Alternatively and/or additionally, the software application may have access to various information stored on and/or provided by the user to the mobile device and other applications of the mobile device. For example, the software application may use a location sensing module of the mobile device to obtain information relating to the geographic location of the user. The location sensing module may employ various location sensors of the mobile device such as global positioning system of the mobile device, Wi-Fi based positioning system (Wi-Fi triangulation), or micro-location techniques using tags, beacons, hotspots, transmitters, in order to receive information relating to the geographic location of a user. In certain other embodiments, the sensing module may determine the location of a user by using a network receiver application of the mobile device to identify the address and location of a connected Wi-Fi or a mobile communication network. Alternatively and/or additionally, the sensing module may determine the location of a user by accessing calendar entries stored in a calendar application (and/or travel organizer applications) of the mobile device, and correlating the calendar entries to the time.

In another embodiment, the software application may obtain information relating to the user-profile and/or demographic information by interfacing with one or more mobile applications that may include such information. Examples of such mobile applications may include, without limitation, social media applications such as Facebook, Twitter, and WhatsApp; cloud sourcing applications such as Yelp and Pinterest; the operating server of the mobile device for accessing information provided by the user (profile settings, language selections, etc.); communication applications (email, messaging, etc.), and other similar means. Example of user-profile and/or demographic information may include, without limitation, the user's primary language of communication (based on language settings, etc.), user's primary region of residence (based on social media information, etc.), user's occupation, and other such information.

The above types of user information and mechanisms for obtaining the user profile information are provided by way of example only and it will be understood to those skilled in the art that other types of user information and mechanisms are within the scope of this disclosure.

In step 206, the messaging system may update the received user profile information with the token information and/or the secondary information, and store the updated user profile information in association with the user identifier information. For example, the messaging system may add the purchase time and/or location of product related to the product packaging container to the user profile information.

In step 207, the messaging system may analyze the token information, user information and/or the secondary information to identify and/or generate a message. For example, if the extracted information includes a product identification information, the software application may search an associated database store(s) and/or server(s) for other message information, including, without limitation, marketing entity instructions for steps to be performed upon identification of a product. Examples may include, for example, marketing entity instructions to display promotional information (such as videos or offers of discounts) on the mobile device display, the token reader display and/or the product container display. The instructions may also include message content and/or message templates for the mobile device to that the mobile device may identify and use. Additionally and/or optionally, the instructions may simply include rules (such as message content requirements, formats, message delivery address, etc.) for generation of a message for delivery to the mobile electronic device. In an embodiment, a user may customize the instructions for identification/generation of the message.

A marketing entity such as a manufacturer, vendor, or other providers may continually update such information provided by the database store(s) and/or server(s). The messaging system may chose the appropriate database store(s) and/or server(s) using matching techniques known in the art or rules provided by the manufacturer, vendor, or other providers. For example, beverage manufacturer may specify the databases for retrieving information for different types of beverages it sells.

In some embodiments, the messaging may use the retrieved information (token information, user information and/or the secondary information) to generate and/or identify the message as per the defined rules.

In an embodiment, the generated message includes the product identification information and user identification information. In certain other embodiments, the generated message may also include geographical location of the user. In an embodiment, a user of the mobile electronic device may customize the generated message.

In an embodiment, the messaging system may be instructed to generate a message including information relating to one or more past locations at which the user previously purchased (and/or experienced) the product associated with the packaging container. The message may also include information about one or more prospective locations where the user may purchase or experience the product associated with the packaging container. For example, the token readers may enable a user to play a user engagement game based on purchasing, consuming and/or experiencing a product in a series of specific locations. For example, the game may include drinking a beverage at locations A, B, C, and D in that sequence. At location B, the user may scan the beverage container token, and the token reader may transmit token information (including location ID-B) and user identification information (received from user's mobile device) to a messaging system. The messaging system may then receive user profile information (including information about product purchase at location A) and update the user profile information with purchase information at location B. The messaging system may also send a mobile electronic device associated with the user, information relating to the next purchase locations C and/or D.

In another embodiment, the message may include a promotional message (such as a video), associated with the product, retrieved by the messaging system, as discussed above. The messaging system may format the message to be compatible for display on the token reader display, mobile electronic device display, and/or the product container display, and transmit the message to the token reader and/or the product container.

The marketing entity may use the personal information of the user to send to the user, without limitation, customized and targeted promotional information (such as coupons), brand or cross-brand advertisements, loyalty program information and rewards, photos, associated videos, feedback requests, and/or additional product information. In an embodiment, the marketing entity may send the above information to the user's mobile electronic device. In certain other embodiments, the marketing entity may send the information to the token reader and or the product packaging display directly (or via the mobile electronic device).

The marketing entity may also use the personal information of the user to create product mapping database associated with multiple users and/or token readers. The product mapping database may include information such as products purchased by a user in a defined time period, products placed in a particular token reader in a defined time period, products purchased by a user in a particular location, etc.

In an embodiment, the messaging system may transmit 208 the generated message. As discussed above, the message generation and/or identification rules provided by a marketing entity may also provide a message delivery address (destination) and/or format. For example, the rules may instruct the messaging system to instruct a mobile electronic device associated with the user to post the message on a social media platform associated with the identified user, such as Facebook, Twitter, Google+, etc. In an embodiment, the messaging system may directly post the message on a social media platform associated with the identified user, such as Facebook, Twitter, Google+, etc. (i.e., without the use of the mobile electronic device). In another embodiment, the rules may instruct the messaging system to transmit the message to the marketing entity. In some embodiments, the messaging system may identify a message including a promotional video (or other content associated with the product) and may be instructed to deliver the message to the mobile electronic device display, the token reader display, and/or the product packaging label display.

Figure 3:
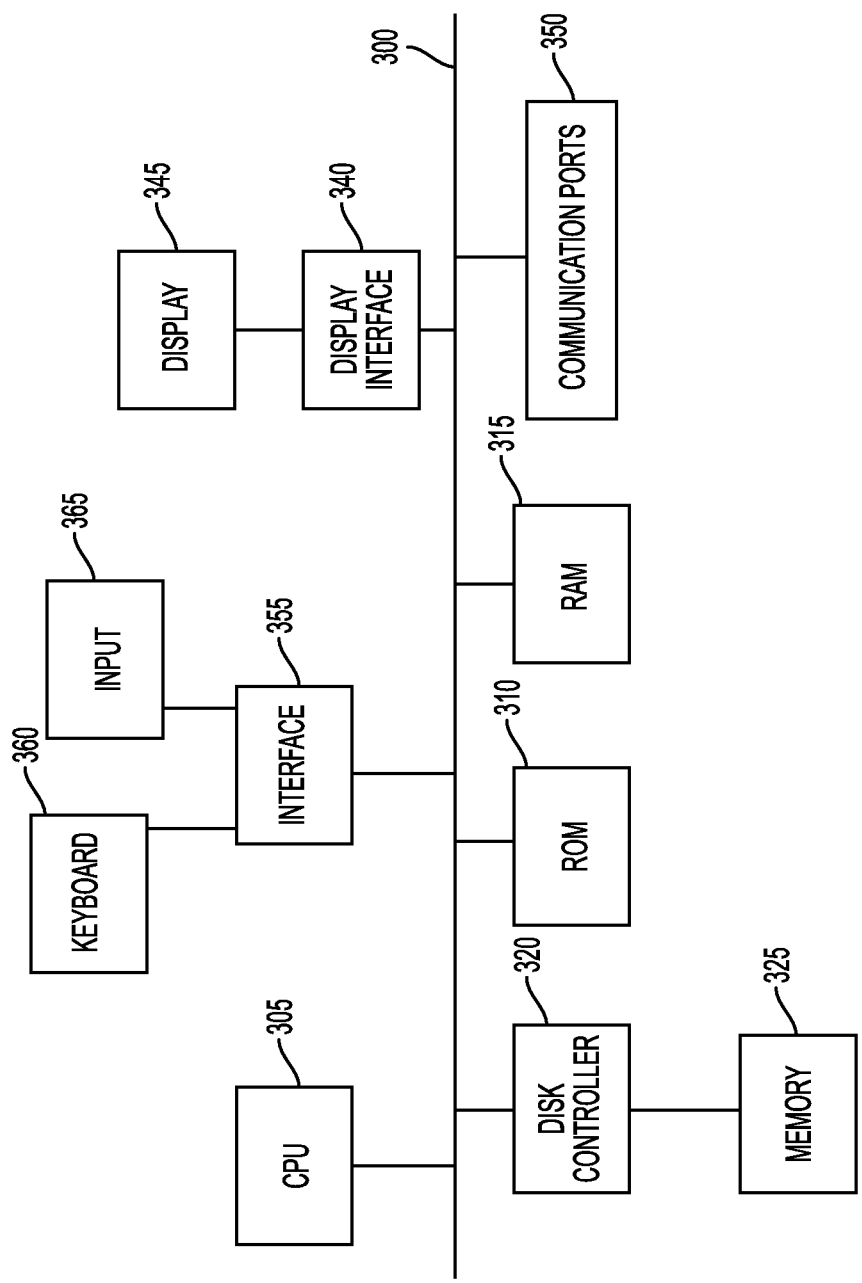
FIG. 3 illustrates a block diagram of example hardware that may be used to contain or implement program instructions according to an embodiment.

The network access discovery method and process as described above may be performed and implemented by an operator of a mobile electronic device and/or a print device. FIG. 3 depicts an example of internal hardware that may be used to contain or implement the various computer processes and systems as discussed above. For example, the mobile electronic device discussed above may include hardware such as that illustrated in FIG. 3. An electrical bus 300 serves as an information highway interconnecting the other illustrated components of the hardware. CPU 305 is a central processing unit of the system, performing calculations and logic operations required to execute a program. CPU 305, alone or in conjunction with one or more of the other elements, is a processing device, computing device or processor as such terms are used within this disclosure. A CPU or "processor" is a component of an electronic device that executes programming instructions. The term "processor" may refer to either a single processor or to multiple processors that together implement various steps of a process. Unless the context specifically states that a single processor is required or that multiple processors are required, the term "processor" includes both the singular and plural embodiments. Read only memory (ROM) 310 and random access memory (RAM) 315 constitute examples of memory devices. The term "memory device" and similar terms include single device embodiments, multiple devices that together store programming or data, or individual sectors of such devices.

A controller 320 interfaces with one or more optional memory devices 325 that service as date storage facilities to the system bus 300. These memory devices 325 may include, for example, an external or internal disk drive, a hard drive, flash memory, a USB drive or another type of device that serves as a data storage facility. As indicated previously, these various drives and controllers are optional devices. Additionally, the memory devices 325 may be configured to include individual files for storing any software modules or instructions, auxiliary data, incident data, common files for storing groups of contingency tables and/or regression models, or one or more databases for storing the information as discussed above.

Program instructions, software or interactive modules for performing any of the functional steps associated with the processes as described above may be stored in the ROM 310 and/or the RAM 315. Optionally, the program instructions may be stored on a non-transitory, computer readable medium such as a compact disk, a digital disk, flash memory, a memory card, a USB drive, an optical disc storage medium, and/or other recording medium.

An optional display interface 340 may permit information from the bus 300 to be displayed on the display 345 or otherwise presented by a user interface such as a display device or audio speaker in audio, visual, graphic or alphanumeric format. Communication with external devices may occur using various communication ports 350. A communication port 350 may be attached to a communications network, such as the Internet, a local area network, a WiFi network, or a cellular telephone data network. Communication with external devices may occur using various communication components such as an antenna, transmitter component and/or receiver 350.

The hardware may also include an interface 355 which allows for receipt of data from input devices such as an imaging sensor 360 of a scanner or other input device 365 such as a keyboard, a mouse, a joystick, a touchscreen, a remote control, a pointing device, a video input device and/or an audio input device.

The above-disclosed features and functions, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

The invention claimed is:

1. A system for promoting user-product engagement, the system comprising:
   a plurality of token readers, wherein each of the plurality of token readers comprises a coaster configured to further comprise:
      one or more sensors configured to detect a code from a token associated with a packaged product when the token is in a range of the sensor, and also detect a user identifier from a proximate mobile electronic device, and
      a transmitter; and
   a messaging system server comprising a processor, a computer-readable memory, and programming instructions configured to cause the processor to:
      receive a signal emitted by any of the plurality of transmitters associated with each of the plurality of token readers, wherein the signal includes a detected code, a user identifier and a token reader ID,
      retrieve, from a data store, profile information for a user who is associated with the user identifier, update the profile information with product information corresponding to the detected code and location information corresponding to the token reader ID, save the updated profile information to the data store, retrieve a marketing communication that corresponds to the detected code and the user identifier, cause a display included in the token reader from which the signal was received to output the marketing communication to the user, process the profile information for the user and retrieve one or more past locations at which the user previously purchased units of the packaged product, identify one or more prospective locations that are not yet included in the profile information for the user, and cause a user interface of the mobile electronic device to present a message to the user, the message comprising the one or more past locations indicating where the user has previously purchased units of the packaged product, and the one or more prospective locations recommendations indicating prospective locations where the user can purchase units of the packaged product.

2. The system of claim 1, wherein:

the packaged product comprises a beverage container on which the token is applied; and the range of each sensor comprises an area proximate to the one or more sensors corresponding to the token reader so that the sensor reads the token when the beverage container is placed proximate to the token reader.

3. The system of claim 1, wherein:

each of the plurality of token readers comprises an imaging device;

the packaged product comprises a beverage container on which a token comprising a barcode has been applied; and the range of each sensor comprises an area proximate to the one or more sensors corresponding to the token reader so that the imaging device captures an image of the barcode and decodes the barcode when the beverage container is placed proximate to the token reader.

4. The system of claim 1, wherein:

each of the plurality of token readers comprises a near-field communication receiver or radio-frequency identification device;

the packaged product comprises a beverage container on which a token comprising a tag that is detectable by the token reader is attached; and the range of each sensor comprises an area proximate to the one or more sensors corresponding to the token reader so that the token reader detects the tag when the tag is placed proximate to the token reader.

5. The system of claim 1, wherein the instructions further comprise instructions to:

identify a marketing entity that is associated with the packaged product;

generate a message for the marketing entity so that the message includes the product information and user identifier; and send the message to the marketing entity.

6. The system of claim 1, wherein the instructions further comprise instructions to:

identify a marketing entity that is associated with the packaged product;

identify a location associated with the token reader ID;

generate a message for the marketing entity so that the message includes the product information and the location; and send the message to the marketing entity.

7. The system of claim 1, wherein the mobile electronic device comprises the messaging system server.

8. The system of claim 1, further comprising additional instructions that are configured to cause the processor to:

identify a social media account that is associated with the user identifier; and generate a message that will cause a social media service to post a communication to the social media account, wherein the communication includes an identifier of the packaged product.

9. The system of claim 1, further comprising additional instructions that are configured to cause the processor to:

transmit the marketing communication to at least one of the following: the token reader from which the signal was received, the mobile electronic device, or the packaged product.

10. A method of promoting user-product engagement, the method comprising:

detecting, using a sensor associated with a token reader that comprises a coaster, a code from a token associated with a packaged product when the token is in a range of the sensor;

detecting, using the sensor, a user identifier from a proximate mobile electronic device;

receiving, at a messaging system server, a signal emitted by a transmitter associated with the token reader, wherein the signal includes a detected code, a user identifier and a token reader ID; and by a processor of the messaging system server:

retrieving, from a data store, profile information for a user who is associated with the user identifier, updating, the profile information with product information corresponding to the detected code and location information corresponding to the token reader ID, saving the updated profile information to the data store, retrieving a marketing communication that corresponds to the detected code and the user identifier, causing a display included in the token reader from which the signal was received to output the marketing communication to the user, processing the profile information for the user and retrieve one or more past locations at which the user previously purchased units of the packaged product, identifying one or more prospective locations that are not yet included in the profile information for the user, and causing a user interface of the mobile electronic device to present a message to the user, the message comprising the one or more past locations indicating where the user has previously purchased units of the packaged product, and the one or more prospective locations recommendations indicating prospective locations where the user can purchase units of the packaged product.

11. The method of claim 10, wherein:

the packaged product comprises a beverage container on which the token is applied; and the range of the sensor comprises an area proximate to the sensor corresponding to the token reader so that the sensor reads the token when the beverage container is placed proximate to the token reader.

12. The method of claim 10, wherein:
the token reader comprises an imaging device;
the packaged product comprises a beverage container on which a token comprising a barcode has been applied; and
the range of the sensor comprises an area proximate to the sensor corresponding to the token reader so that the imaging device captures an image of the barcode and decodes the barcode when the beverage container is placed proximate to the token reader.

13. The method of claim 10, wherein:
the token reader comprises an near-field communication receiver or radio-frequency identification device;
the packaged product comprises a beverage container on which a token comprising a tag that is detectable by the token reader is attached; and
the range of the sensor comprises an area proximate to the sensor corresponding to the token reader so that the token reader detects the tag when the tag is placed proximate to the token reader.

14. The method of claim 10, further comprising, by the processor of the messaging system server:
identifying a marketing entity that is associated with the packaged product;
generating a message for the marketing entity so that the message includes the product information and user identifier; and
sending the message to the marketing entity.

15. The method of claim 10, further comprising, by the processor of the messaging system server:
identifying a marketing entity that is associated with the packaged product;
identifying a location associated with the token reader ID;
generating a message for the marketing entity so that the message includes the product information and the location; and
sending the message to the marketing entity.

16. The method of claim 10, wherein the mobile electronic device comprises the messaging system server.

17. The method of claim 10, further comprising, by the processor of the messaging system server:
identifying a social media account that is associated with the user identifier; and
generating a message that will cause a social media service to post a communication to the social media account, wherein the communication includes an identifier of the packaged product.

18. The method of claim 10, further comprising, by the processor of the messaging system server:
transmitting the marketing communication to at least one of the following: the token reader from which the signal was received, the mobile electronic device, or the packaged product.

19. A method for promoting user-product engagement using a mobile electronic device associated with a user, the method comprising:
receiving, from a token reader comprising a coaster, by a processor of the mobile electronic device, a token reader ID and a code from a token associated with a packaged product;
retrieving, by the processor of the mobile electronic device, profile information for a user;
retrieving, by the processor of the mobile electronic device, location information corresponding to the token reader ID;
updating, by the processor of the mobile electronic device, the profile information with product information corresponding to the detected code and the location information;
saving the updated profile information to a data store;
retrieving a marketing communication that corresponds to the detected code and the user identifier;
causing a display included in the token reader from which the signal was received to output the marketing communication to the user;
processing the profile information for the user and retrieve one or more past locations at which the user previously purchased units of the packaged product;
identifying one or more prospective locations that are not yet included in the profile information for the user; and
causing a user interface of the mobile electronic device to present a message to the user, the message comprising the one or more past locations indicating where the user has previously purchased units of the packaged product, and the one or more prospective locations recommendations indicating prospective locations where the user can purchase units of the packaged product.

20. The method of claim 19, further comprising, by the processor of the mobile electronic device:
identifying a marketing entity that is associated with the packaged product;
generating a message for the marketing entity so that the message includes the product information and the profile information; and
sending the message to the marketing entity.

21. The method of claim 19, further comprising, by the processor of the mobile electronic device:
identifying a marketing entity that is associated with the packaged product;
generating a message for the marketing entity so that the message includes the product information and the location information; and
sending the message to the marketing entity.

22. The method of claim 19, further comprising, by the processor of the mobile electronic device:
identifying a social media account that is associated with the user; and
generating a message that will cause a social media service to post a communication to the social media account, wherein the communication includes an identifier of the packaged product.

23. The method of claim 19, further comprising, by the processor of the mobile electronic device:
transmitting the marketing communication to at least one of the following: the token reader or the packaged product.

* * * * *